United States Patent

Skappel

[15] 3,648,721
[45] Mar. 14, 1972

[54] CONTROL VALVE

[72] Inventor: Einar Skappel, Nysetveiess Ranfass, Mjolby, Sweden

[22] Filed: Jan. 9, 1969

[21] Appl. No.: 790,042

[30] Foreign Application Priority Data

Jan. 11, 1968 Norway ....................................115/68

[52] U.S. Cl.........................................137/408, 137/624.14
[51] Int. Cl..........................................................F16k 31/00
[58] Field of Search.............137/396, 402, 404, 408, 624.13, 137/624.14; 251/120, 43, 325

[56] References Cited

UNITED STATES PATENTS 3,273,579 9/1966 Koculyn..........................137/624.14 X
3,272,225 9/1966 Frampton .....................137/624.14 X

*Primary Examiner*—M. Cary Nelson
*Assistant Examiner*—David R. Matthews
*Attorney*—Kurt Kelman

[57] ABSTRACT

In a piston valve, two valve chambers are interconnected by an axial bore in the piston through which liquid flows continuously. As the liquid pressure in one chamber increases, it moves the piston and closes the valve. The closing movement is controlled in the following manner: a liquid receiving chamber receives liquid from that chamber and trickles it through a nozzle when a pilot valve is open, and is shut off from the chamber to increase the pressure therein gradually when the pilot valve is closed. A tiltable bucket is mounted to receive the trickling liquid and has a pilot valve opening cam for closing the pilot valve when the bucket has been filled with liquid trickling from the nozzle and for opening the pilot valve when the bucket is in the opening position ready to receive the liquid from the nozzle.

3 Claims, 2 Drawing Figures

INVENTOR.
EINAR SKAPPEL
BY
AGENT

CONTROL VALVE

The invention relates to control valves for fluids and particularly to automatic control valves wherein a piston is moved to and from a closed position by fluid pressure of a medium flowing to and through the valve.

It is an object of the present invention to provide a valve which automatically will control the flow of a fluid through the valve and which is operated by the pressure of the fluid itself without giving rise to any line shocks or "water hammer" as the valve is opened or closed.

A further object is to provide a control valve of the character described to control automatically the spraying or sprinkling of gardens, parks, plantations or similar objects which needs spraying of any kind of fluid.

The present invention is directed to an improved control valve comprising a valve housing, a valve head closing said valve housing at one end, the valve housing having an inlet port at the opposite end and a stepped bore being formed through the valve housing with the minor diameter bore nearest to the inlet port and a valve seat being formed at the junction between the said minor bore and the inlet port. Said valve housing also comprises an outlet port or passage branching off the said minor diameter bore, a stepped piston slideable within said stepped bore and a valve being formed on the end of the piston for seating in said valve seat, a bypass extending from said minor bore to the major bore behind the piston and a breather passage connecting a part of said major bore in front of said piston with the atmosphere, the valve further comprising means for regulating the pressure in the major bore behind the piston.

Other objects and advantages will appear from the following description of preferred embodiments of the invention when considered in connection with the accompanying drawing and the novel features will be particularly pointed out in the appended claims.

IN THE DRAWINGS

FIG. - IS A LONGITUDINAL SECTIONAL VIEW OF A CONTROL VALVE INCORPORATING THE INVENTION IN A FIRST EMBODIMENT AND

FIG. 1 is a longitudinal sectional view of a control valve incorporating the invention in a first embodiment and FIG. 2 is a side view partly in section and on a reduced scale of another embodiment of the invention.

DESCRIPTION OF THE PREFERRED EMBODIMENTS

Figure 1:
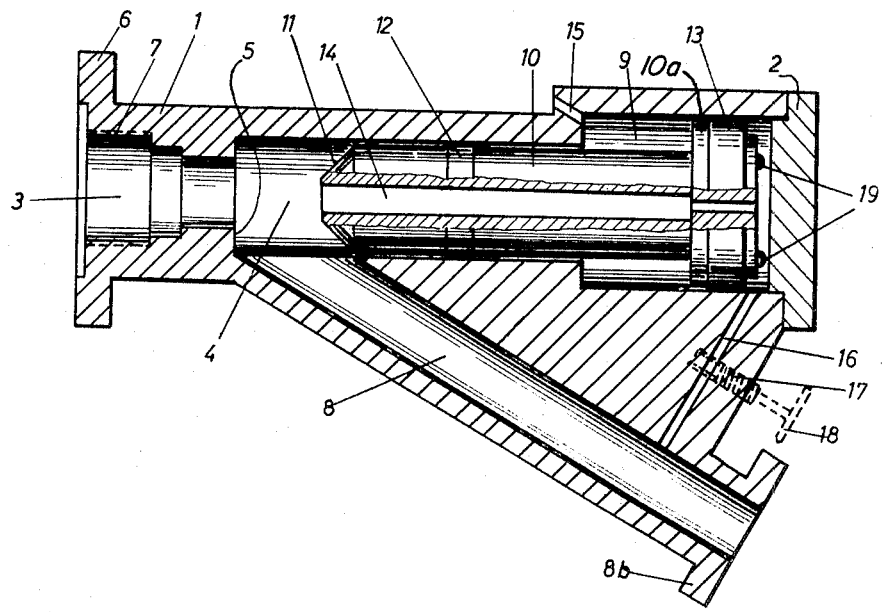

Referring to FIG. 1 of the drawing the invention consists essentially of a valve housing 1 being closed at one end by means of a valve head 2 and having an inlet port 3 at the opposite end, a stepped bore being formed through the valve housing 1 and comprising a minor diameter bore 4 nearest to the inlet port 3, a valve seat 5 being formed at the junction between said minor bore 4 and said inlet port 3. The valve housing 1 is at the inlet end provided with a flange 6 and/or internal pipe threads 7 for connection to a fluid line or by means of an adapter to a hose (not shown). The valve head 2 is connected to the valve housing 1 by means of stud bolts and interposed gasket or any other desired connecting means (not shown). The valve housing 1 further comprises an outlet port or passage 8 branching off the said minor diameter bore 4 and forming an acute angle with the longitudinal axis of the valve housing 1 and integrally with same. Similar to the inlet port 3 the outlet passage 8 is also provided with a flange 8b for connection to a fluid line or may have pipe threads as already described (not shown). In axial movement with the minor diameter bore 4 the valve housing 1 comprises a major diameter bore 9 extending from the minor bore 4 rearwardly to the valve head 2. In the thus described stepped bore 4, 9 correspondingly stepped piston 10, 10a is arrange axially slideable and having a valve seating member 11 formed at one end for seating in said valve seat 5 in the closed position of the valve. The stepped piston 10, 10a is provided with sealing rings 12, 13 respectively on its smaller and greater diameter portions. These sealing rings may be made integrally with the piston or may consist of any suitable sealing rings arranged in recesses in the piston in a known manner. Furthermore the piston 10, 11a has a bypass passage 14 arranged axially through same and connecting the minor bore 4 with the major bore 9 which bores are otherwise sealed off by sealing rings 12, 13. The bypass passage 14 serves as a throttle and may comprise a filter having a predetermined throttling effect (not shown). In order to let the piston 10, 10a slide freely in the stepped bore of the valve housing 1 the portion of the major bore in front of the piston portion 10a is connected with the atmosphere by means of a breather passage 15.

Furthermore, the major bore behind the piston portion 10a is connected with the outlet passage 8 by means of a small diameter channel 16 branching off the passage 8 at right angle.

In cases where the valve shall operate as an automatic regulating valve in a fluid supply system the above described embodiment will be sufficient for operation of the valve by fluid pressure alone and more specifically the pressure of a medium flowing through the valve. In such cases the valve described above will function as follows.

Initially the fluid will enter the valve though the inlet port 3 open the valve by pushing the piston 10, 10a towards the valve head 2 because no counter-pressure will exist in the major bore behind the piston. It should in this connection be noted that the back side of the piston 10, 10a which is representing the largest surface of the stepped piston has several projections 19 to prevent the piston from blocking the channel 16 during its opening movement. In open position of the valve the fluid will follow two flow lines, one directly through the outlet passage 8 and the other through the bypass 14 to the major bore behind the piston and further through the small diameter 16 to the outlet 8.

In this embodiment of the valve according to the invention the piston 10 is actuated by the existing pressures in the inlet and outlet lines and the valve will move to its closed position if the pressure in the outlet passage 8 rises and thus increases the static pressure in the small channel 16 connecting the outlet 8 with the major bore behind he piston 10, 10a. Consequently this very simple valve construction may for instance be used for water supply systems or other fluid systems wherein it is important to maintain a certain water or fluid level in a reservoir and will automatically close when a predetermined level is achieved.

For maintenance purposes or for manual control the valve may be provided with a shut-off valve 17 which may be manually operated by a hand wheel 18 as indicated in the drawing. It will however be obvious to experts that this auxiliary valve 17 may be a pilot valve actuated in a number of ways, for instance by means of a float or similar means or by a solenoid coil remotely controlled in order to function as a shut-off valve.

Figure 2:
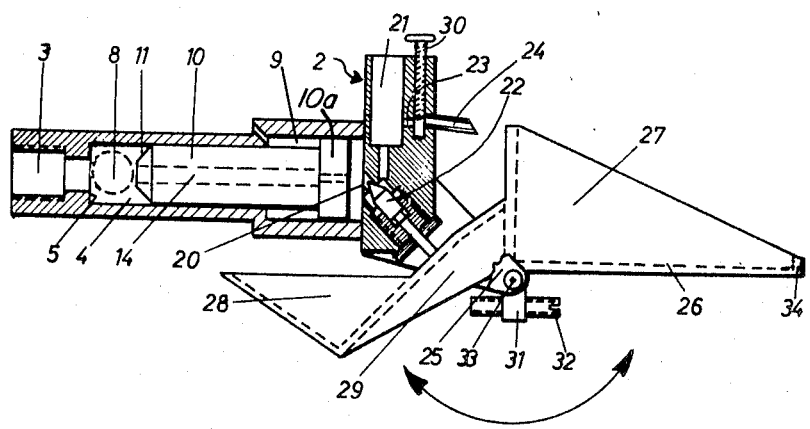

With reference to FIG. 2, which represents a preferred embodiment of the control valve assembly, the valve assembly comprises similar components as described above with exception of the valve head 2 which in this embodiment is further developed in order to provide a control valve suitable for automatic watering or spraying of gardens, parks, plantations and any other objects which need spraying of any kind of fluid.

Like elements functioning in a like manner have been designed by like reference numerals in FIG. 2 to avoid redundancy in the description.

In this embodiment the valve head has a passage 20 connecting the major bore behind the piston portion 10a with a chamber 21 in the valve head 2 and a pilot valve 22 adapted for closing said passage 20, said chamber 21 having an outlet passage 23 with a nozzle 24 serving as a discharge means for the fluid contained in the chamber 21. Pivotally mounted on a double bracket 25 connected to the valve head 2 is a bucket 26 which is divided into two compartments 27 and 28, said bucket 26 being pivotable between an upright position and a lowered position as indicated in FIG. 2. In the lowered position of the bucket 26 a portion 29 of the bucket located between and attached to the two compartments of the bucket is actuating the pilot valve 22 in a camlike fashion and closing the pilot valve 22. Further the valve head 2 comprises a regulating screw 30 for controlling the discharge through the nozzle 24. A further regulating means comprises an extension of the bucket 26 downwardly and forming a boss 31 being provided with a bore having screw threads and a threaded weight 32 which is screwed into the boss for correct balancing of the bucket 26. The two compartments of the bucket 26 are arranged in such a manner that in the upright position of the bucket 26 the compartment 28 will be emptied of its contents and in the lowered position of the bucket 26 the other compartment 27 will be emptied of its contents. The pilot valve 22 simply consists of a small needle valve which may be moved between an open and a closed position, the latter being indicated in the drawing and the valve is actuated by means of a portion 29 of the bucket 29.

The operation of the control valve is as follows:

The fluid enters through the inlet port 3 and pushes the piston 10 provided the pilot valve 22 is in open position which means that the bucket 26 must be in its upright position. Simultaneously the fluid will flow through the bypass 14 into the major bore behind the piston and through the channel 20 into the chamber 21 and through the outlet passage 23 and the nozzle 24 and trickle down into the compartment 27 of the bucket 26. It will be obvious that initially the fluid pressure acting on the smaller area of the stepped piston will be larger than the fluid pressure acting in the larger area of the stepped piston and thus cause the opening of the main valve 5, 11 (FIG. 1). In this position of the valve the fluid will flow freely from the inlet port 3 to the outlet port or passage 8 and in use the inlet port 3 will be connected to a fluid supply and the outlet portion or passage 8 is connected to a hose and further to a sprinkler or spraying device or any other kind of outlet to be controlled.

The fluid flowing through the bypass 14 and through the various passages or channels in the valve head 2 will drip into the compartment 27 of the bucket 26 and slowly fill it up. As the compartment 27 of the bucket 26 fills up with fluid a vertical line through the center of gravity of the fluid body in the compartment 27 will move past the pivot point 33 and the bucket 26 is so balanced and constructed that, when the compartment 27 is nearly filled up, the bucket will tilt to a lowered position as shown in FIG. 2, closing the pilot valve 22 by its tilting movement. When the pilot valve is closed, the fluid pressure in the chamber or major bore 9 behind the piston portion 10a builds up and this will cause movement of the port or passage of is connected to a closed position of the main valve 5, 11. In the lowered position of the bucket 26 most of the fluid collected in the compartment 27 will be split over the edge 34 of the compartment 27, but the remaining amount of fluid will be sufficient to maintain the bucket 26 in the lowered position and the pilot valve will thus remain closed. The remaining fluid in the compartment 27 will start evaporating and the rate of evaporation will follow closely the evaporation rate from the soil or other objects that might be sprayed. The bucket 26 is open and so constructed that rain or drizzle will fall into the compartment 27 and keep the bucket in a lowered position, if the valve for instance is being used for watering and placed outside in the free atmosphere. When the compartment 27 is in a lowered position and fluid is evaporating from the bucket 26 the compartment 28 is in a lifted position and when the weight of the fluid body in the compartment 27 decreases to such an extent that a small degree of tilting of the bucket 26 takes place and consequently the pilot valve 22 starts to open, fluid will start to drip down from the upper edge of the chamber 21 into the compartment 28. This will create a counterweight which will accelerate the tilting of the bucket 26 to the upright position. In this position the fluid collected in the compartment 28 will be emptied, the pilot valve 22 opens completely and the stepped piston 10 is moving to an open position of the valve and fluid will again flow freely through the valve and into the outlet port 8. It will be noted that as the stepped piston moves in either direction the pressure in the major bore 9 in front of the piston portion 10a will change very little since this chamber or major bore is connected to the atmosphere by means of the breather passage 15.

It will also be noted that the time taken to fill up the compartment 27 while the bucket 26 is in an upright position may be regulated by means of the adjusting screw 30 and that this time is identical to the spraying or sprinkling time. It will further be noted that the time of the intervals between spraying can be regulated by adjusting the threaded weight 32 since screwing the weight forward or backwards will decrease or increase the initial torque created by the weight of the fluid body in the compartment 27 when the bucket 26 is in a downward or lowered position, thus regulating the amount of fluid which has to be evaporated before the bucket is able to tilt to an upward or upright position.

What I claim is:
1. A valve comprising
   1. a valve housing having
      a. an inlet port at one end of the housing for admitting a liquid into the housing, and
      b. a stepped bore extending through the housing from the inlet port to an end of the housing opposite the one end, the bore consisting of a minor diameter portion adjacent the inlet port and a major diameter portion adjacent the opposite end;
   2. a valve seat at the junction between the inlet port and the minor diameter bore portion;
   3. an outlet passage branching off the minor diameter bore of the valve housing for delivering the admitted liquid;
   4. a stepped piston slidable in the stepped valve housing bore and having a minor diameter portion and a major diameter portion respectively slidable in the minor and major diameter bore portions,
      a. the major diameter piston portion dividing the major diameter bore portion into two chambers, one of the chambers being adjacent the minor diameter bore portion and the other chamber being adjacent the opposite valve housing end,
      b. a constantly open bypass passage through the piston to permit the admitted liquid to flow between the minor diameter bore portion and the other major diameter bore portion chamber, and
      c. a breather passage in the valve housing for venting the one major diameter bore portion chamber to the atmosphere;
   5. a valve seating member on the minor diameter piston portion for seating on the valve seat in a closed valve position wherein liquid flow from the inlet port to the outlet passage is cut off and for being spaced from the valve seat in an open valve position wherein the liquid flows from the inlet port into the outlet passage; and
   6. means for controllably moving the valve seating member between the closed and open valve positions, the moving means including
      a. a valve head closing the opposite valve housing end, the other major diameter bore portion chamber being defined between the major diameter piston portion and the valve head,
      b. a liquid receiving chamber in the valve head,
      c. a liquid delivery passage in the valve head to permit liquid to flow from the other major diameter bore portion chamber to the liquid receiving chamber,
      d. a liquid outlet nozzle for trickling liquid from the liquid receiving chamber,
      e. a pilot valve in the liquid delivery passage movable between a closed position and an open position, the liquid pressure in the other major diameter bore portion chamber increasing gradually when the pilot valve is in the closed position and liquid is admitted through the inlet port and the bypass passage for gradually mov- ing the valve seating member into the closed position under the increasing pressure, and the liquid pressure gradually decreasing when the pilot valve is in the open position to permit the liquid flow from the major diameter bore portion chamber into the liquid receiving chamber whence it trickles through the outlet nozzle, f. a tiltable bucket mounted on the valve head under the outlet nozzle to receive liquid trickling therefrom and to permit the received liquid to be evaporated therefrom, the bucket being tiltable between a pilot valve opening and a pilot valve closing position, the bucket being constructed to empty a large part of the received liquid when tilted into the pilot valve closing position whereby it assumes a relatively unstable position resulting in tilting of the bucket into the pilot valve opening position upon relatively minor evaporation of the liquid remaining therein, and g. a pilot valve operating member on the bucket for closing the pilot valve when the bucket has been filled with liquid trickling from the nozzle to assume the closing position and for opening the pilot valve when the bucket is in the opening position ready to receive the liquid trickling from the nozzle.

2. The valve of claim 1, further comprising a set screw in the valve head for regulating the liquid trickle from the liquid receiving chamber in the valve head through the outlet nozzle.

3. The valve of claim 1, further comprising an adjustable balancing weight for regulating the tilting of the bucket.

* * * * *